Patented Sept. 11, 1951

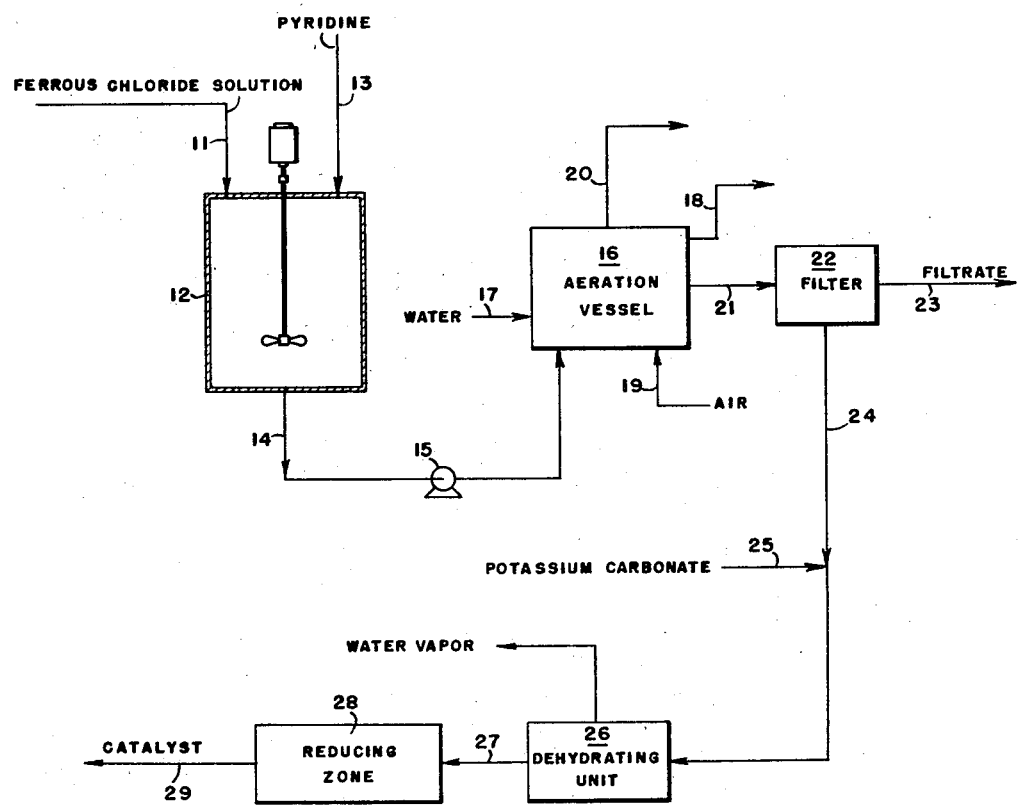

2,567,297

UNITED STATES PATENT OFFICE 2,567,297

PREPARATION OF A FISCHER-TROPSCH CATALYST

Winfred O. Milligan, Houston, and James C. Schiller, Baytown, Tex., assignors, by mesne assignments, to Standard Oil Development Company, Elizabeth, N. J., a corporation of Delaware Application July 5, 1949, Serial No. 103,108

4 Claims. (Cl. 252—474)

The present invention is directed to a method for preparing a composition adapted to be used as a catalyst.

This application is a continuation-in-part of U. S. Serial No. 686,467, filed July 26, 1946, now abandoned, and entitled "Preparation of Catalyst."

It is an object of the present invention to devise a method for preparing a catalyst. More particularly, it is an object of the present invention to devise a method for preparing a catalyst particularly adapted for use in the Fischer-Tropsch synthesis to produce hydrocarbons and oxygenated organic compounds from mixtures of carbon monoxide and hydrogen.

The present invention may be described briefly as involving the preparation of an admixture of iron oxide and a compound comprising an alkali or alkaline earth metal, heating the mixture to high temperatures to convert the major portion of the $Fe_3O_4$ to $Fe_2O_3$ in the gamma oxide form thereby obtaining a catalyst mass having a major portion of the iron oxide in the gamma crystalline form of $Fe_2O_3$ and stablized against change in crystalline form by the stabilizing material. The stabilized gamma $Fe_2O_3$ is reduced at elevated temperature to form an active catalyst.

In our copending application U. S. Serial No. 97,436, filed June 6, 1949, and entitled "Catalyst and Method of Preparation Thereof," we have described the composition which is prepared in accordance with the present invention. In the foregoing application a composition is disclosed and claimed which includes a major portion of gamma iron oxide crystals and a minor portion of a stabilizing agent in admixture therewith, which admixture has been contacted with a reducing atmosphere at super-atmospheric temperatures.

The method of the present invention may be described briefly as involving the steps of forming gamma ferric oxide monohydrate, mixing the monohydrate with a stabilizing agent, heating the mixture to dehydrate the gamma ferric oxide monohydrate whereby a mixture of $Fe_2O_3$ in the form of gamma crystals and a stabilizing agent is obtained and the admixture subsequently reduced at elevated temperatures. Specific examples of stabilizing agents which may be used are potassium carbonate, potassium hydroxide and potassium oxide, either alone or in admixture; it will be understood that the carbonates, hydroxides and oxides of the other alkali or alkaline earth metals may be used as stabilizing agents, if desired, either alone or in admixture. It will usually be desirable to employ a stabilizing agent in an amount within the range of 1 to 15% by weight calculated as metal oxide.

When preparing the gamma ferric oxide monohydrate it is convenient to react a solution of ferrous chloride with pyridine to obtain a complex of tetrapyridino-ferrous chloride and subsequently contact the complex in solution with an oxygen-containing gas to obtain gamma ferric oxide monohydrate. The gamma ferric oxide monohydrate may then be intimately mixed with the stabilizing agent before dehydrating. The dehydrated oxide mixed with stabilizing agent is preferably treated with hydrogen at a temperature in the range of 750° F. to 1400° F. in order to obtain an activated catalyst particularly suitable in the Fischer-Tropsch synthesis.

The present invention will now be described in greater detail in conjunction with the drawing in which the sole figure is in the form of a diagrammatic flow sheet.

Saturated ferrous chloride solution is introduced through inlet line 11 into vessel 12 which is of the turbo-treated type. Pyridine is introduced into vessel 12 through inlet line 13. The volume of pyridine is at least 4 times that of the ferrous chloride solution. Within vessel 12 the pyridine and ferrous chloride react under atmospheric temperature and pressure to produce complex tetrapyridino ferrous chloride. The product from vessel 12 is in the form of a slurry and is removed through line 14 containing pump 15 to aeration vessel 16. The slurry in vessel 16 is admixed with water introduced through inlet 17 and removed through outlet 18. It is desirable to employ water in an amount within the range of 50 to 100 times the volume of the ferrous chloride solution introduced through inlet 11. After the complex is admixed with water, air is introduced into the vessel through inlet 19 and passes outwardly through outlet 20. The air serves to oxidize the complex and simultaneously agitates it to insure intimate contact between the complex and the oxygen. Contacting the complex with air converts it to gamma ferric oxide monohydrate and a slurry of the monohydrate is removed from vessel 16 through outlet 21 to a filter 22. In filter 22 the slurry is separated into a filtrate which is removed through outlet 23 and may be sent to suitable recovery means, not shown, for the recovery of the pyridine. The wet filter cake is removed through outlet 24 and is admixed with stabilizing agent, such as an aqueous solution of potassium carbonate, introduced through inlet 25. The mixture of gamma ferric monohydrate and potassium carbonate then passes to dehydrating unit 26 where the mixture is subjected to suitable temperature conditions to convert the monohydrate into $Fe_2O_3$ in the gamma oxide form. The dried mass from unit 26 comprises $Fe_2O_3$ in the gamma form in admixture with stabilizing agent. Before employing the mixture as the catalyst in the Fischer-Tropsch synthesis, it is subjected to a reducing atmosphere at an elevated temperature. This activating step may be conducted by passing the mass from unit 26 through line 27 to reducing zone 28 where the mass may be maintained at a temperature in the range between 750° and 1400° F. in an atmosphere containing dry hydrogen for an interval of approximately 4 hours. The activated catalyst may then be removed through line 29 and is suitable for immediate use in a catalytic process such as the Fischer-Tropsch synthesis.

It is to be emphasized that in the practice of the present invention the addition of stabilizing agent to the ferric oxide allows the ferric oxide to be heated to a relatively high temperature without converting appreciable amounts of gamma crystals into a crystalline form which after reduction is less active as a catalyst. This allows the dehydrating step and the activating step to be carried out at temperatures in the order of 750° to 1400° F. without appreciably altering the activity of the finished catalyst.

In order to illustrate the present invention further the following examples are given showing comparative results obtained when employing alpha $Fe_2O_3$ and gamma $Fe_2O_3$ as catalysts in the synthesis of hydrocarbons and oxygenated organic compounds.

Example I

Pellets comprising alpha iron oxide and 0.2 weight per cent potassium oxide were reduced in the presence of dry hydrogen gas for four hours at a temperature of about 900° F. and at atmospheric pressure, the hydrogen feed rate being maintained at 1000 volumes per volume of promoted iron oxide pellets per hour. A mixture comprising hydrogen and carbon monoxide in a ratio of 1:1 was then passed over the catalyst at a feed rate of 225 volumes per volume of catalyst per hour and at a pressure of 150 pounds per square inch gauge. The temperature of the catalyst bed was carefully controlled at 550° F. The products were segregated into a water phase, a liquid phase comprising hydrocarbons and oxygenated hydrocarbons, and a gaseous phase comprising unreacted feed $CO_2$, and gaseous hydrocarbons. The yield of $C_4$ and heavier products was found to be 146 cc. per cubic meter of CO and $H_2$ charged and 177 cc. per cubic meter of CO and $H_2$ consumed. The selectivity, determined as the ratio of $C_4$ and heavier products of $C_4$ and heavier products times 100 was determined to be 64.8.

Example II

A mixture comprising a major portion of $Fe_2O_3$ in the form of gamma oxide crystals and 2.0 weight per cent potassium oxide (added as $K_2CO_3$) was reduced in the presence of dry hydrogen gas for 4 hours at a temperature of about 900° F. A mixture of $H_2$ and CO in a ratio of 1.24:1 was passed over the catalyst at a rate of 144 volumes per volume of catalyst per hour, a temperature of 550° F., and a pressure of 150 pounds per square inch gauge. The products were segregated and measured and the yields of $C_4$ and heavier products based respectively on the $H_2$ and CO charged and consumed were 174 and 225 cc. per cubic meter of gas. The water layer yield was found to be equivalent to 40 cc. per cubic meter of $H_2$ and CO consumed. The water layer contained 7.9 weight per cent alcohols (calculated as ethanol), had an acid normality of 0.334 showing the presence of organic acids, and had a carbonyl molarity (calculated as acetone) of 1.192 showing the presence of ketones and aldehydes. The hydrocarbon layer containing a minor portion of hydrocarbon-soluble oxygenated hydrocarbons had a specific gravity at 20° C./4° C. of 0.795 and a bromine number of 56. The selectivity was found to be 70.6.

Example III

A sample of $Fe_3O_4$ was treated by the procedure described in Example I with the exception that no $K_2CO_3$ was added as promoter. The $Fe_3O_4$ was reduced by passing dry hydrogen gas over it at a temperature of 900° F.; following the reduction treatment $H_2$ and CO (1.22:1 ratio) was passed over the catalyst at a rate of 215 volumes per volume of catalyst per hour, a pressure of 150 pounds per square inch gauge, and a temperature of 600° F. $C_4$ and heavier product yields on the $H_2$ and CO charged and consumed were respectively 91 and 110 per cubic meter of gas. The selectivity was 40.2. The X-ray diffraction pattern of the unpromoted iron oxide before reduction was identical to a standard alpha $Fe_2O_3$ pattern.

Example IV

A first catalyst sample containing 0.2% $K_2O$ (added as $K_2CO_3$) and comprising predominantly alpha iron oxide was reduced by contact with dry hydrogen gas at 900° F. Synthesis gas having $H_2$ and CO in the ratio of 1.22:1 was passed over the catalyst at a temperature of 650° F., a pressure of 150 pounds per square inch gauge and a feed rate of 244 volumes per volume of catalyst per hour. The yields of $C_4$ and heavier product were 112 and 124 cc. per cubic meter of $H_2$ and CO charged and consumed, respectively, with a selectivity of 43.2. The hydrocarbon layer contained approximately 0.5 weight per cent of $\overline{OH}$ and the alcohols present were chiefly $C_3$ and heavier. The water layer contained approximately 1.7% alcohol calculated as ethyl alcohol.

A second catalyst sample containing 1.0% $K_2O$ (added as $K_2CO_3$) and comprising predominantly a mixture of alpha and gamma iron oxides was reduced as described in Example II. Synthesis gas having $H_2$ and CO in the ratio of 1.22:1 was passed over the catalyst at a temperature of 650° F., a pressure of 150 lbs. per square inch gauge and a feed rate of 290 volumes per volume of catalyst per hour. Yields of $C_4$ and heavier product of 165 and 191 cc. per cubic meter of $H_2$ and CO charged and consumed, respectively, with a selectivity of 65.4 were obtained. The hydrocarbon layer contained approximately 2 weight per cent $\overline{OH}$. The water layer contained 7.6 weight per cent of alcohol calculated as ethyl alcohol. It will be seen that the second catalyst gave substantially improved results in that it produced higher yields of useful hydrocarbons as well as oxygenated hydrocarbons.

Example V

Pulverized magnetic black ferroso-ferric oxide was treated with varying amounts of a solution of aluminum nitrate, the solution being added as an aqueous solution to portions of the ferroso-ferric oxide to provide catalyst masses, as will be described, having varying amounts of aluminum oxide contained therein. The thick pastes resulting from the admixture was mulled and dried in a circulating oven at a temperature of about 225° F. for about 24 hours. During the drying operation it was observed that brownish fumes of nitrogen oxides were being evolved. The dried material, after the aforesaid period, was then pulverized, pilled into $\frac{3}{16}''$ pills, heated for about 4½ hours at a temperature of 1000° F. in the presence of air, and cooled in the presence of air. The resulting $Fe_2O_3$ samples containing various amounts of $Al_2O_4$ was then examined by X-ray diffraction procedures well known to the art. The diffraction patterns thus obtained were compared with X-ray diffraction patterns on samples of pure alpha $Fe_2O_3$. The following results were obtained:

| Wt. Per Cent $Al_2O_3$ in Oxides | Results of X-ray Examinations on Promoted Iron Oxides |
|---|---|
| 0 | Standard alpha $Fe_2O_3$ Pattern. |
| 0.5 | Alpha $Fe_2O_3$ plus Additional Lines. |
| 1.0 | Alpha $Fe_2O_3$ only. |
| 2.0 | Alpha $Fe_2O_3$ only. |
| 5.0 | Alpha $Fe_2O_3$ only. |

It will be seen from the foregoing table that the ferric oxide prepared in the foregoing manner and containing from 0.5 to 5% by weight of added aluminum oxide was in the alpha $Fe_2O_3$ crystalline form after drying and heating under the aforesaid conditions. It will be apparent that the alpha structure was formed under these conditions when aluminum oxide was present.

*Example VI*

In this example catalysts were prepared as described in Example IV with the exception that the catalyst contained both aluminum oxide and potassium oxide. In this instance the potassium oxide and aluminum oxide were added as aqueous solutions of potassium carbonate and aluminum nitrate to pulverized magnetic black ferroso-ferric oxide in varying quantities to produce catalysts on treating, as will be described, having different amounts of potassium oxide and aluminum oxide. The thick pastes resulting from admixture of the oxide and the aqueous solutions were mulled and dried in a circulating oven at a temperature of about 225° F. for about 24 hours. Evolution of nitrogen oxide fumes were observed during the drying operation. The dried material was then pulverized, pelleted into $\frac{3}{16}''$ pills, heated for about 4½ hours at a temperature of 1000° F. in the presence of air, and cooled in the presence of air. The resulting $Fe_2O_3$ samples containing various amounts of $K_2CO_3$ (reported as $K_2O$) and aluminum oxide were then examined by X-ray diffraction procedures to obtain the results given in the following table:

| Wt. Per Cent $K_2O$ in Iron Oxides | Wt. Per Cent $Al_2O_3$ in Iron Oxides | Results of X-ray Examinations on Promoted Iron Oxides |
|---|---|---|
| 0.2 | 5.0 | Standard alpha $Fe_2O_3$ Pattern plus few Additional lines. |
| 0.2 | 0.2 | Alpha $Fe_2O_3$. |
| 1.0 | 1.0 | Gamma $Fe_2O_3$+alpha FeO. |
| 5.0 | 0.2 | Do. |

It will be seen from the results in the foregoing table that the X-ray diffraction patterns show that when 5% by weight of aluminum oxide is present and 0.2% of potassium oxide is present, the alpha $Fe_2O_3$ structure prevails, but as the content of potassium oxide increases to above 1.0%, the structure of the iron oxide is changed to the gamma $Fe_2O_3$ structure which is the desirable form for use in the practice of the present invention.

*Example VII*

In order to illustrate further the desirability of employing the alkali metal compounds as stabilizers in distinction to varying amounts of aluminum oxide as stabilizers, a number of runs were made under the conditions given in Example I in which the catalysts containing varying amounts of aluminum oxide were reduced in the presence of dry hydrogen gas for about 4 hours at a temperature of 900° F. at atmospheric pressure, the hydrogen feed rate being maintained at 1000 volumes per volume of catalyst (iron oxide containing aluminum oxide) per hour. The feed mixture comprising hydrogen and carbon monoxide in a ratio of 1:1 was passed over the catalyst at a feed rate varying from 200 to 300 volumes per volume of catalyst per hour and at a pressure of 150 per square inch. The temperature of the catalyst bed was controlled at 550° F. The products were segregated into a water phase, a liquid phase comprising hydrocarbons and oxygenated hydrocarbons, and a gaseous phase comprising unreacted feed $CO_2$ and gaseous hydrocarbons. The yield data for the catalyst containing from 0 to 5% by weight of aluminum oxide are given in the following table:

| Per Cent $Al_2O_3$ | Total Yields, cc./$M^3$ of $CO+H_2$ | |
|---|---|---|
| | Charge | Consumed |
| 0 | 65 | 95 |
| 1 | 90 | 110 |
| 2 | 100 | 120 |
| 5 | 55 | 75 |

It will be noted from the foregoing table that with a catalyst such as described in Example VII containing no aluminum oxide, the yields of hydrocarbons and oxygenated compounds in cc.'s per cubic meter of carbon monoxide and hydrogen charged and consumed were very small. It will be seen that increasing amounts of aluminum oxide in the catalyst increased the yields slightly when 1 and 2% of aluminum oxide were present but when 5% by weight of aluminum oxide were present in the catalyst, lesser quantities of hydrocarbons and oxygenated organic compounds were produced. On comparison with the results in the previous examples it will be observed that the presence of potassium oxide as a stabilizer for the gamma iron oxide structure gives appreciably higher yields than the presence of aluminum oxide in a catalyst which before reduction has an alpha iron oxide structure.

While specific temperature ranges to which the catalyst should be heated in the presence of oxygen and in the presence of hydrogen are given in the range between 750° to 1400° F., actually this temperature may vary widely within the range given. For example, at 750° F., the catalyst may be subjected to heat treatment in the presence of oxygen and a reduction treatment in the presence of hydrogen for about 24 hours whereas at intermediate temperatures in this range, the time of contact will be considerably less. For example, at around 1000° F., the time of approximately 4½ hours should be sufficient whereas at higher temperatures of approximately 1400° F., a considerably shorter time will be required which may be as little as 10 to 30 minutes. If higher temperatures than 1400° F. are exceeded, there is danger of the gamma iron oxide containing the promoter reverting to an undesirable form. At temperatures as high as 1600° F. the stabilizing effect of the alkali metal compounds may be lost.

While the specific examples of the practice of the present invention have been described, it is to be understood that these examples are given only by way of illustration and not by limitation. It will be obvious to a workman skilled in the art that the stabilizing agent may be employed over a relatively wide range of concentration and that the temperatures and pressures employed in the various steps in the preparation of the catalyst may be varied over a substantial range without departing from the scope of the invention.

Having fully described and illustrated the practice of the present invention, what is desired to be claimed as new and useful and to be secured by Letters Patent is:

1. A method for preparing a composition suitable for use as a catalyst comprising the steps of admixing gamma ferric oxide monohydrate with a stabilizing agent consisting of a compound selected from the oxides, hydroxides, and carbonates of the alkali metals in an amount in the range between 1% and 15% by weight, subjecting the mixture to a temperature in the range between 750° and 1400° F. in the presence of a free oxygen-containing atmosphere for a time in the range between 10 minutes and 24 hours to obtain a mixture of $Fe_2O_3$ in the form of gamma crystals and stabilizing agent, and subsequently contacting the mixture with a reducing atmosphere at a temperature in the range between 750° and 1400° F. for a time in the range between 10 minutes and 24 hours.

2. A method for preparing a composition suitable for use as a catalyst comprising the steps of admixing gamma ferric oxide monohydrate with a stabilizing agent consisting of a compound selected from the oxides, hydroxides and carbonates of the alkali metals in an amount in the range between 1 and 15% by weight, subjecting the admixture to a temperature of the order of 1000° F. in the presence of a free oxygen-containing atmosphere for about 4 hours to obtain a mixture of $Fe_2O_3$ in the form of gamma crystals and stabilizing agent, and subsequently contacting the mixture with a reducing atmosphere at a temperature of the order of 900° F. for about 4 hours.

3. A method of forming a mass suitable for use as a catalyst comprising the steps of forming an admixture of a complex including ferric oxide in the gamma crystalline form and a compound selected from the oxides, hydroxides and carbonates of the alkali metals in an amount in the range between 1 and 15% by weight, treating the admixture by heating it to a temperature in the range between 750° and 1400° F. in the presence of a free oxygen-containing atmosphere for a time in the range between 10 minutes and 24 hours to convert the complex to $Fe_2O_3$ in the form of gamma crystals and subsequently contacting the heated mixture with a reducing atmosphere at a temperature in the range between 750° and 1400° F. for a time in the range between 10 minutes and 24 hours.

4. A method of forming a mass suitable for use as a catalyst comprising the steps of forming an admixture of a complex including ferric oxide in the gamma crystalline form and a compound selected from the oxides, hydroxides, and carbonates of the alkali metals in an amount in the range between 1% and 15% by weight, treating the admixture by heating it to a temperature of the order of 1000° F. in the presence of a free oxygen-containing atmosphere for about 4 hours to convert the complex to $Fe_2O_3$ in the form of gamma crystals, and subsequently contacting the heated admixture with a reducing atmosphere at a temperature of the order of 900° F. for about 4 hours.

JAMES C. SCHILLER.
WINFRED O. MILLIGAN.

REFERENCES CITED

The following references are of record in the file of this patent:

UNITED STATES PATENTS

| Number | Name | Date |
|---|---|---|
| 2,365,094 | Michael et al. | Dec. 12, 1944 |
| 2,438,584 | Stewart | Mar. 30, 1948 |
| 2,461,147 | Davies et al. | Feb. 8, 1949 |
| 2,472,501 | Sweetser | June 7, 1949 |
| 2,483,512 | Voorhies et al. | Oct. 4, 1949 |